United States Patent
Robinson

(10) Patent No.: US 11,459,944 B2
(45) Date of Patent: Oct. 4, 2022

(54) ULTRA-HIGH TEMPERATURE THERMAL ENERGY STORAGE SYSTEM

(71) Applicant: THE UNIVERSITY COURT OF THE UNIVERSITY OF EDINBURGH, Lothian (GB)

(72) Inventor: Adam Robinson, Galashiels (GB)

(73) Assignee: THE UNIVERSITY COURT OF THE UNIVERSITY OF EDINBURGH, Edinburgh (GB)

(*) Notice: Subject to any disclaimer, the term of this patent is extended or adjusted under 35 U.S.C. 154(b) by 0 days.

(21) Appl. No.: 17/057,439

(22) PCT Filed: May 22, 2019

(86) PCT No.: PCT/GB2019/051412
§ 371 (c)(1),
(2) Date: Nov. 20, 2020

(87) PCT Pub. No.: WO2019/224538
PCT Pub. Date: Nov. 28, 2019

(65) Prior Publication Data
US 2021/0207527 A1  Jul. 8, 2021

(30) Foreign Application Priority Data
May 23, 2018 (GB) ..................... 1808478

(51) Int. Cl.
*F02C 1/04* (2006.01)
*F28D 20/00* (2006.01)
*F16K 11/07* (2006.01)

(52) U.S. Cl.
CPC ............ *F02C 1/04* (2013.01); *F28D 20/0056* (2013.01); *F05D 2220/32* (2013.01);
(Continued)

(58) Field of Classification Search
CPC .............. F02C 1/04; F28D 20/0056; F28D 2020/0078; F05D 2220/32; F05D 2220/76; F16K 11/07
See application file for complete search history.

(56) References Cited

U.S. PATENT DOCUMENTS 8,904,793 B2 * 12/2014 Hemrle ................. F28D 20/021
60/659
2008/0016866 A1    1/2008 Mohr
(Continued)

FOREIGN PATENT DOCUMENTS

DE  10 2011 017 311 A1   10/2012
GB  0 245 9955.5 A       11/2009
(Continued)

OTHER PUBLICATIONS

Search Report for GB 1808478.0 dated Oct. 24, 2018 (4 pages).
Invitation to Pay additional Fees and Partial International Search Report and Written Opinion on PCT/GB2019/051412 dated Sep. 5, 2019.

*Primary Examiner* — Shafiq Mian
(74) *Attorney, Agent, or Firm* — Foley & Lardner LLP

(57) ABSTRACT

There is provided a thermal energy storage system, comprising at least two thermal storage masses, wherein an inner thermal storage mass (48) is contained within an outer thermal storage mass (49). A pump or compressor (42) forces a compressible fluid around the system. A first storage mass heat exchanger (50) has a first side in fluid communication with the pump or compressor (42), and a second side in contact with the outer thermal storage mass (49). A second storage mass heat exchanger (51) has a first side in fluid communication with the first side of the first storage mass heat exchanger (50), and a second side in contact with the inner thermal storage mass (48). A turbine (43) has a turbine inlet in fluid communication with the first side of the second storage mass heat exchanger (51), and a turbine outlet. An electrical generator is driven by the turbine (43).

(Continued)

The system further comprises a thermal store (52) containing a thermal store medium. At least one thermal input heat exchanger (55) is located in the thermal store (52), the at least one thermal input heat exchanger having a first side adapted to receive heat from the outer thermal storage mass (49), and a second side in contact with the thermal store medium. At least one thermal output heat exchanger (53) is also located in the thermal store (52), the at least one thermal output heat exchanger having a first side in fluid communication with a hot water and/or heating supply, and a second side in contact with the thermal store medium.

13 Claims, 12 Drawing Sheets

(52) U.S. Cl.
CPC .......... *F05D 2220/76* (2013.01); *F16K 11/07* (2013.01); *F28D 2020/0078* (2013.01)

(56) References Cited

U.S. PATENT DOCUMENTS

| | | | |
|---|---|---|---|
| 2011/0314812 A1* | 12/2011 | Sonwane | F28D 20/0034 60/641.8 |
| 2012/0312496 A1* | 12/2012 | Howes | F02C 6/16 126/400 |
| 2013/0081394 A1* | 4/2013 | Perry | F22B 1/028 126/610 |
| 2014/0366536 A1* | 12/2014 | Muren | F03G 6/00 126/618 |
| 2015/0176920 A1* | 6/2015 | Vendeirinho | F24D 11/006 165/4 |
| 2018/0245485 A1* | 8/2018 | Conlon | F01K 23/10 |
| 2019/0003308 A1* | 1/2019 | Laughlin | F01D 1/02 |

FOREIGN PATENT DOCUMENTS

| | | | | |
|---|---|---|---|---|
| WO | WO-2017079617 A1 * | 5/2017 | | F01K 3/18 |
| WO | WO2017198397 A1 | 11/2017 | | |

* cited by examiner

ULTRA-HIGH TEMPERATURE THERMAL ENERGY STORAGE SYSTEM

CROSS-REFERENCE TO RELATED APPLICATIONS

This application is a U.S. National Stage Application under 35 U.S.C. 371 of International Application No. PCT/GB2019/051412, filed on May 22, 2019, which claims the benefit of priority to GB Patent Application No. 1808478.0, filed on May 23, 2018, the content of each of which is incorporated herein by reference in its entirety.

FIELD OF THE INVENTION

The present invention relates to the field of thermal energy storage, and more specifically a system for thermal energy storage at ultra-high temperatures in excess of 873K (600° C.).

BACKGROUND OF THE INVENTION

Energy sourced from renewable sources such as the sun, wind, waves or tides has significant environmental benefits over that sourced from fossil fuels and the like. Unfortunately, the energy that can be extracted from renewables and the demand for it varies both in terms of time and geographical location. Therefore, energy storage is required to match generation with use. To date grid-scale energy storage has been limited by low energy densities, long-term performance degradation, low round-trip efficiencies or limited deployment locations. Although thermal storage has found uses these have been restricted to lower temperatures by thermal losses resulting in low energy densities and uneconomical electricity generation efficiency.

Thermal energy storage is a fully reversible process that does not have any of the by-products and degradation over multiple cycles seen in electrochemical storage approaches, for example. Until now thermal energy storage has been limited to a temperature of around 800K (527° C.), making it uncompetitive in terms of energy density and transfer efficiency from heat to electricity. Consequently, thermal energy storage has only seen widespread deployment to collect heat for later re-use. By storing energy as heat at ultra-high temperatures (i.e. greater than 1100K (827° C.)), it is possible to raise energy density and transfer efficiency to the point where grid-scale thermal storage becomes technically and economically feasible. Thus far, the operating temperature of thermal storage has been limited by heat loss that rises exponentially with increasing temperature.

It is therefore an aim of the present invention to provide a thermal energy storage system which operates at ultra-high temperature, which minimises and/or recovers heat losses.

SUMMARY OF THE INVENTION

According to a first aspect of the invention there is provided a thermal energy storage system, comprising:
- at least two thermal storage masses, wherein an inner thermal storage mass is contained within an outer thermal storage mass;
- a pump or compressor which forces a compressible fluid around the system;
- a first storage mass heat exchanger having a first side in fluid communication with the pump or compressor, and a second side in contact with the outer thermal storage mass;
- a second storage mass heat exchanger having a first side in fluid communication with the first side of the first storage mass heat exchanger, and a second side in contact with the inner thermal storage mass;
- a turbine having a turbine inlet in fluid communication with the first side of the second storage mass heat exchanger, and a turbine outlet; and
- an electrical generator which is driven by the turbine;

wherein the system further comprises:
- a thermal store containing a thermal store medium;
- at least one thermal input heat exchanger located in the thermal store, the at least one thermal input heat exchanger having a first side adapted to receive heat from the outer thermal storage mass, and a second side in contact with the thermal store medium; and
- at least one thermal output heat exchanger located in the thermal store, the at least one thermal output heat exchanger having a first side in fluid communication with a hot water and/or heating supply, and a second side in contact with the thermal store medium.

The system may further comprise:
- first and second turbine outlet heat exchangers, each having a first side in fluid communication with the turbine outlet; and
- a liquid jacket surrounding the outer thermal storage mass, the liquid jacket in fluid communication with the first side of the at least one thermal input heat exchanger;
- wherein a second side of the first turbine outlet heat exchanger is in contact with the outer thermal storage mass; and
- a second side of the second turbine outlet heat exchanger is in contact with the liquid jacket.

Alternatively, the system may further comprise:
- first and second thermal input heat exchangers located in the thermal store;
- a third storage mass heat exchanger having a first side in contact with the outer thermal storage mass, and a second side in fluid communication with the first side of the first thermal input heat exchanger; and
- a turbine outlet heat exchanger having a first side in contact with the turbine outlet, and a second side in fluid communication with a first side of the second thermal input heat exchanger.

The turbine outlet may comprise an exhaust or a condenser.

The system may further comprise a storage mass bypass downstream of the pump or compressor, the bypass selectively sending the compressible fluid directly to the turbine whilst bypassing the first and second storage mass heat exchangers.

The system may further comprise:
- a combustor having an inlet in fluid communication with the second storage mass heat exchanger and the storage mass bypass, and an outlet in fluid communication with the turbine; and
- a combustor bypass for selectively sending fluid directly to the turbine from the second storage mass heat exchanger or storage mass bypass whilst bypassing the combustor.

The inner storage mass may contain one or more electrical heating components for direct heating of the storage mass.

The system may further comprise a first insulating barrier surrounding the inner thermal storage mass, the barrier comprising:
- an inner layer abutting an outer surface of the inner thermal storage mass;

a honeycomb layer abutting the inner ceramic layer;
an outer layer spaced apart from the honeycomb layer such that a void is formed therebetween; and
an enclosing envelope upon the outer layer.

The void may be at least partially filled with one or more attenuators extending from the honeycomb layer to the outer layer.

The first insulating barrier may be formed from a plurality of separate barrier panels, where each panel is enclosed by a separate envelope. Each insulating barrier panel may further comprise at least one structural support member which extends through the void in a direction generally parallel to the layers of the barrier.

The system may further comprise:
a second insulating barrier surrounding the outer thermal storage mass, the second insulating barrier being formed from a cellular and/or porous material;
a vacuum pump fluidly connected to the first and second insulating barriers so as to form and vary the strength of a vacuum therein; and
a plurality of valves which allow the vacuums in the insulating barriers to be varied independently.

The system may have at least one control valve, the at least one control valve comprising:
a valve body defining an inlet and at least one outlet;
a valve stem extending through a portion of the valve body and being axially movable relative thereto, the valve stem having a proximal end, and a distal end engagable with a valve actuator; and
a valve member attached to the proximal end of the valve stem such that the valve member opens and closes the at least one outlet upon movement of the valve stem;
wherein the valve stem and valve member are formed from a material having a first thermal expansion coefficient, and the valve body is formed from a material having a second thermal expansion coefficient.

The first thermal expansion coefficient may be between $4\times10^{-6}$ and $24\times10^{-6}$ K$^{-1}$, and the second thermal expansion coefficient may be between $-4\times10^{-6}$ and $4\times10^{-6}$ K$^{-1}$.

A difference between the first and second thermal expansion coefficients may be negligible, and the valve may further comprise at least one first sealing element located between the valve body and the valve stem, and at least one second sealing element located between the valve body and the valve member, wherein the sealing elements are formed from a material having a thermal expansion coefficient between $4\times10^{-6}$ and $24\times10^{-6}$ K$^{-1}$, and the first and second thermal expansion coefficients are between $-4\times10^{-6}$ and $4\times10^{-6}$ K$^{-1}$.

At least one of the heat exchangers may comprise:
a plurality of open elements, each open element comprising a plurality of open cells extending along the length of the heat exchanger;
a plurality of solid elements, each solid element extending along the length of the heat exchanger;
wherein the open elements and solid elements are arranged alternately in a circumferential direction about a centre axis of the heat exchanger.

The system may further comprise at least one fluid transmission pipe, the pipe comprising:
an inner pipe wall defining a central bore;
a honeycomb layer abutting an outer surface of the central pipe wall;
an outer pipe wall concentric with the inner pipe wall, the outer pipe wall defining a first void between the outer pipe wall and the honeycomb layer; and
a pipe body concentric with the inner and outer pipe walls, the pipe body defining a second void between the pipe body and the outer pipe wall.

The first void in the fluid transmission pipe may be at least partially filled with one or more attenuators extending radially from the honeycomb layer to the outer pipe wall.

The pipe attenuators may extend radially from the honeycomb layer to the pipe body.

The inner storage mass may be suspended from the outer storage mass by a plurality of support elements which are in tension.

According to a second aspect of the invention there is provided an insulating barrier for a component, the barrier comprising:
an inner layer which in use abuts an outer surface of the component;
a honeycomb layer abutting the inner layer;
an outer layer spaced apart from the honeycomb layer such that a void is formed therebetween; and
an enclosing envelope upon the outer layer.

The void may be at least partially filled with one or more attenuators extending from the honeycomb layer to the outer layer.

The first insulating barrier may be formed from a plurality of separate barrier panels, where each panel is enclosed by a separate envelope. Each insulating barrier panel may further comprise at least one structural support member which extends through the void in a direction generally parallel to the layers of the barrier.

According to a third aspect of the invention there is provided a control valve comprising:
a valve body defining an inlet and at least one outlet;
a valve stem extending through a portion of the valve body and being axially movable relative thereto, the valve stem having a proximal end, and a distal end engagable with a valve actuator; and
a valve member attached to the proximal end of the valve stem such that the valve member opens and closes the at least one outlet upon movement of the valve stem;
wherein the valve stem and valve member are formed from a material having a first thermal expansion coefficient, and the valve body is formed from a material having a second thermal expansion coefficient.

The first thermal expansion coefficient may be between $4\times10^{-6}$ and $24\times10^{-6}$ K$^{-1}$, and the second thermal expansion coefficient may be between $-4\times10^{-6}$ and $4\times10^{-6}$ K$^{-1}$.

A difference between the first and second thermal expansion coefficients may be negligible, and the valve may further comprise at least one first sealing element located between the valve body and the valve stem, and at least one second sealing element located between the valve body and the valve member, wherein the sealing elements are formed from a material having a thermal expansion coefficient between $4\times10^{-6}$ and $24\times10^{-6}$ K$^{-1}$, and the first and second thermal expansion coefficients are between $-4\times10^{-6}$ and $4\times10^{-6}$ K$^{-1}$.

According to a fourth aspect of the invention there is provided a heat exchanger comprising:
a plurality of open elements, each open element comprising a plurality of open cells extending along the length of the heat exchanger;
a plurality of solid elements, each solid element extending along the length of the heat exchanger;
wherein the open elements and solid elements are arranged alternately in a circumferential direction about a centre axis of the heat exchanger.

According to a fifth aspect of the invention there is provided a fluid transmission pipe, comprising:
- an inner pipe wall defining a central bore;
- a honeycomb layer abutting an outer surface of the central pipe wall;
- an outer pipe wall concentric with the inner pipe wall, the outer pipe wall defining a first void between the outer pipe wall and the honeycomb layer; and
- a pipe body concentric with the inner and outer pipe walls, the pipe
- body defining a second void between the pipe body and the outer pipe wall.

The first void in the fluid transmission pipe may be at least partially filled with one or more attenuators extending radially from the honeycomb layer to the outer pipe wall.

The pipe attenuators may extend radially from the honeycomb layer to the pipe body.

According to a sixth aspect of the invention there is provided a thermal storage apparatus comprising a thermal storage mass configured to be suspended from a support structure, the thermal storage mass comprising a plurality of support elements, wherein each support element has a proximal end attached to the mass, and a distal end connectable in use to the support structure.

The thermal storage mass may be an inner thermal mass and the apparatus may further comprise an outer thermal mass which acts as the support structure.

The apparatus may comprise pairs of support elements, and each element in a pair crosses over the other element in the pair so that each pair of elements defines an X-shape.

BRIEF DESCRIPTION OF THE DRAWINGS

Preferred embodiments of the present invention will now be described, by way of example only, with reference to the following drawings.

DETAILED DESCRIPTION OF THE DRAWINGS

Figure 1:
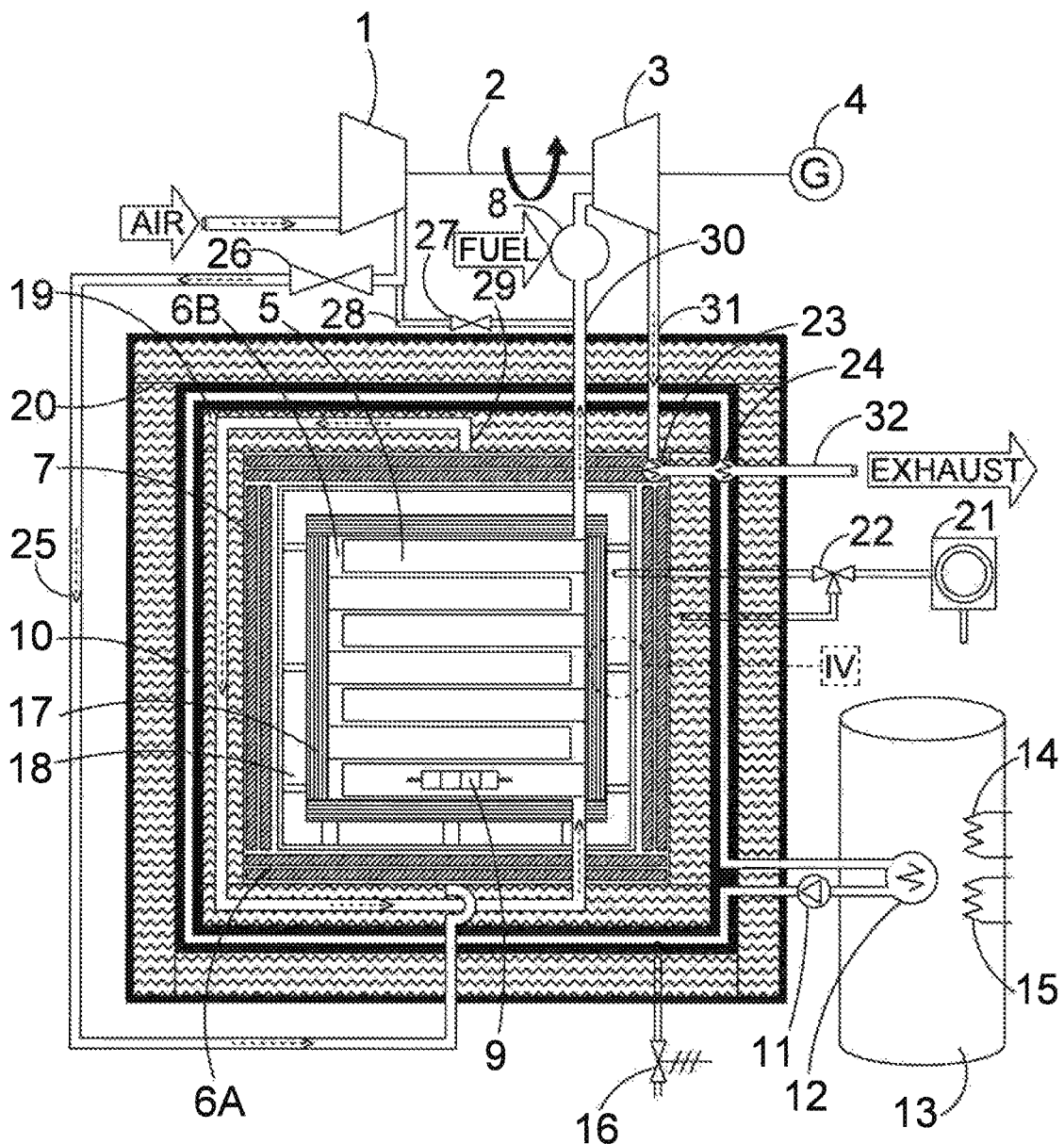
FIG. 1 is a schematic representation of an ultra-high temperature energy storage system (UHTESS)

FIG. 1 schematically illustrates an ultra-high temperature energy storage system (UHTESS) which is primarily, though not exclusively, intended to supply light industrial, commercial and domestic premises. The UHTESS provides heat, electricity and hot water and can be driven by burning combustible gas, liquid or pulverised solid or else by heating gas with energy stored in a medium. Alternatively, a combination of stored heat and combustion can be used.

The illustrated UHTESS comprises a compressor 1 supplied with air. The compressor is connected via a rotatable shaft 2 to a turbine 3. The turbine in turn is connected to a generator 4 for the generation of electricity. The UHTESS has a pair of thermal storage masses, with a first or inner thermal storage mass 5 located within a second or outer thermal storage mass 7. Each mass 5, 7 includes a network of gas passages 6A, 6B which extend through the respective masses 5, 7 and allow direct gas to storage medium contact. The inner mass 5 is formed from bricks made with metals or ceramics, which are stacked so as to support each other's weight and also allow the gas to flow around them in the gas passages 6B.

A heater 9 is located in the inner storage mass 5 and allows the mass to be heated using electricity. The heater 9 may employ resistance or induction heating. The gas passages 6A of the outer mass 7 are fluidly connected to the compressor 1 via a primary supply line 25. A pair of control valves 26, 27 selectively allow compressed air to flow from the compressor into the primary supply line 25 or a bypass line 28 which bypasses the thermal storage masses 5, 7.

Once the compressed air has passed through the outer mass gas passages 6A it then passes through an intermediary supply line 29, which connects the outer mass gas passages 6A with the inner mass gas passages 6B. The inner mass gas passages 6B are themselves fluidly connected with a turbine inlet line 30 which directs the heated compressed gas towards the turbine 3. A combustor 8 is located on the turbine inlet line 30 which allows the air to be further heated and expanded. Optionally, the combustor 8 may include a combustor bypass and associated valve(s) (not shown) which allow the air to bypass the combustor if further heating is not required.

Surrounding the outer storage mass 7 is a liquid-filled jacket 10 which collects lost heat for hot water and heating. A pump 11 circulates liquid from the jacket to a heat exchanger 12 which is located within an external thermal store 13. Hot water and heating is supplied to the premises from the thermal store 13 thanks to respective heat exchangers 14,15 which are in contact with the interior of the store 13. One or more pressure relief valves 16 are provided on the jacket circuit.

To reduce thermal losses the inner storage mass 5 is contained within a thermal insulation structure. A detail view of the insulation structure (identified by the label "IV" in FIG. 1) is described below with reference to FIG. 4 in particular.

To reduce thermal losses from the outer storage mass 7 a conventional insulation layer 19 may be used. This insulation is formed with porous or foamed material, cenospheres or a cellular ceramic surrounded or filled by a gas or a vacuum. A second conventional insulation layer 20 may be provided on the outside of the liquid jacket 10. A vacuum pump 21 may be connected to the insulation layers 18, 19 to vary the strength of the vacuum therein. A system of valves 22 is used to allow the vacuums in the layers 18, 19 to be controlled independently.

Downstream of the turbine 3 is a turbine outlet line 31, which passes gas to a first exhaust heat exchanger 23, which is attached to the outer thermal mass 7. An exhaust line 32 passes the gas through a second exhaust heat exchanger 24 to an exhaust. The second exhaust heat exchanger is in contact with the liquid jacket 10. The exhaust line 32 may include a bypass (not shown) allowing the gas to bypass the second exhaust heat exchanger 24. These exhaust heat exchangers 23, 24 that are in contact with exhaust gas are removable and serviceable to take away fouling from combustion products. If the exhaust heat exchangers 23, 24 are built in ceramic, defouling is achieved with very high temperature gas flows either after removal or in situ. The system may also include a reciprocator which heats the gas after it leaves the compressor using energy from the turbine exhaust.

The UHTESS shown in FIG. 1 may operate as follows. When there is a demand for electricity the compressor 1, shaft 2 and turbine 3 components of the gas turbine are collectively accelerated to operational speed by either driving the turbine 3 with compressed air, an electric motor, the generator 4 configured as an electric motor, a pneumatic motor or a hydraulic motor. Once the turbine 3 has reached a sufficient rotational speed for the compressor 1 to providing a sufficient quantity of pressurised air, the starting device can be switched off. Compressed air is then passed from the compressor 1 through the gas passages 6A, 6B that are formed within the outer and inner thermal masses 7, 5 and which allow direct gas to storage medium contact. This will heat the gas and cause it to expand. At this stage the gas can be passed through the combustor 8 where fuel can be burnt to further heat and expand the gas if required. Once the thermal storage system is depleted it can be bypassed using the second control valve 27 and bypass line 28 to reduce flow losses. The combustor 8 could also be bypassed using valves if it was not required.

Energy is then extracted from the flow and converted to power in via the turbine 3. This rotating motion can be converted into electricity using the generator 4, which is connected to the turbine via the rotating shaft 2.

Energy may be added to the inner storage mass 5 using the electric heater 9. Over time heat will transfer to the outer storage mass 7 where it is collected. Energy will be lost from the outer storage mass 7 to the liquid jacket 10, where it is transferred to the liquid therein. Fluid is circulated through the jacket 10 by the pump 11 to the jacket heat exchanger 12 which sits within the external thermal store, or tank, 13. Hot water may be supplied on demand by passing water through the hot water heat exchanger 14 situated within the tank 13. The additional liquid to liquid heating heat exchanger 15 within the tank 13 may be used to heat liquid used to provide space heating.

After the gas exits the turbine 3 it passes through the first exhaust heat exchanger 23 in contact with the outer thermal mass 7 to recover heat from the exhaust gas heat to the thermal store. Downstream the gas also transfers heat energy to the liquid jacket 10 via the second exhaust heat exchanger 24. It may be necessary to use a pipe and valve to bypass the water jacket heat exchanger (24) to avoid overheating.

As well as a smaller scale standalone UHTESS of the type shown in FIG. 1 an existing thermal power station can be converted to operate as a UHTESS, storing energy as heat when it is abundant and then resupplying it when energy is in demand. The system would provide heat, electricity and hot water and can be driven by either burning combustible gas, liquid, pulverised solid or by heating gas with energy stored in a medium. Alternatively, a combination of stored heat and combustion can be used. Thus, providing energy for daily demands with stored heat and the backup of burning combustible gas to support unpredicted or seasonal demands. Two examples of such conversions are shown in FIGS. 2 and 3.

Figure 2:
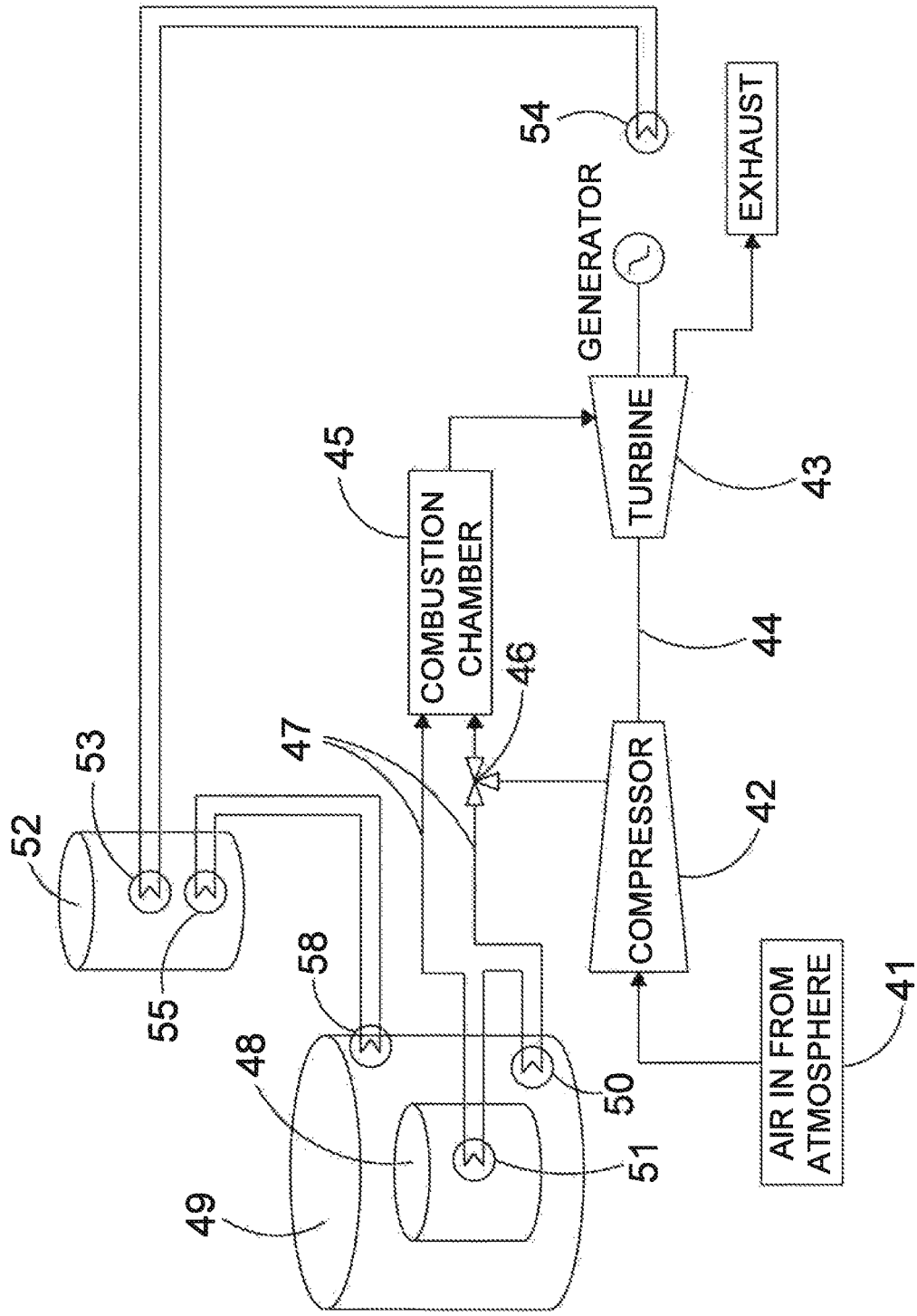
FIG. 2 is a schematic representation of a gas turbine-driven power station which has been converted into a UHTESS.
Figure 3:
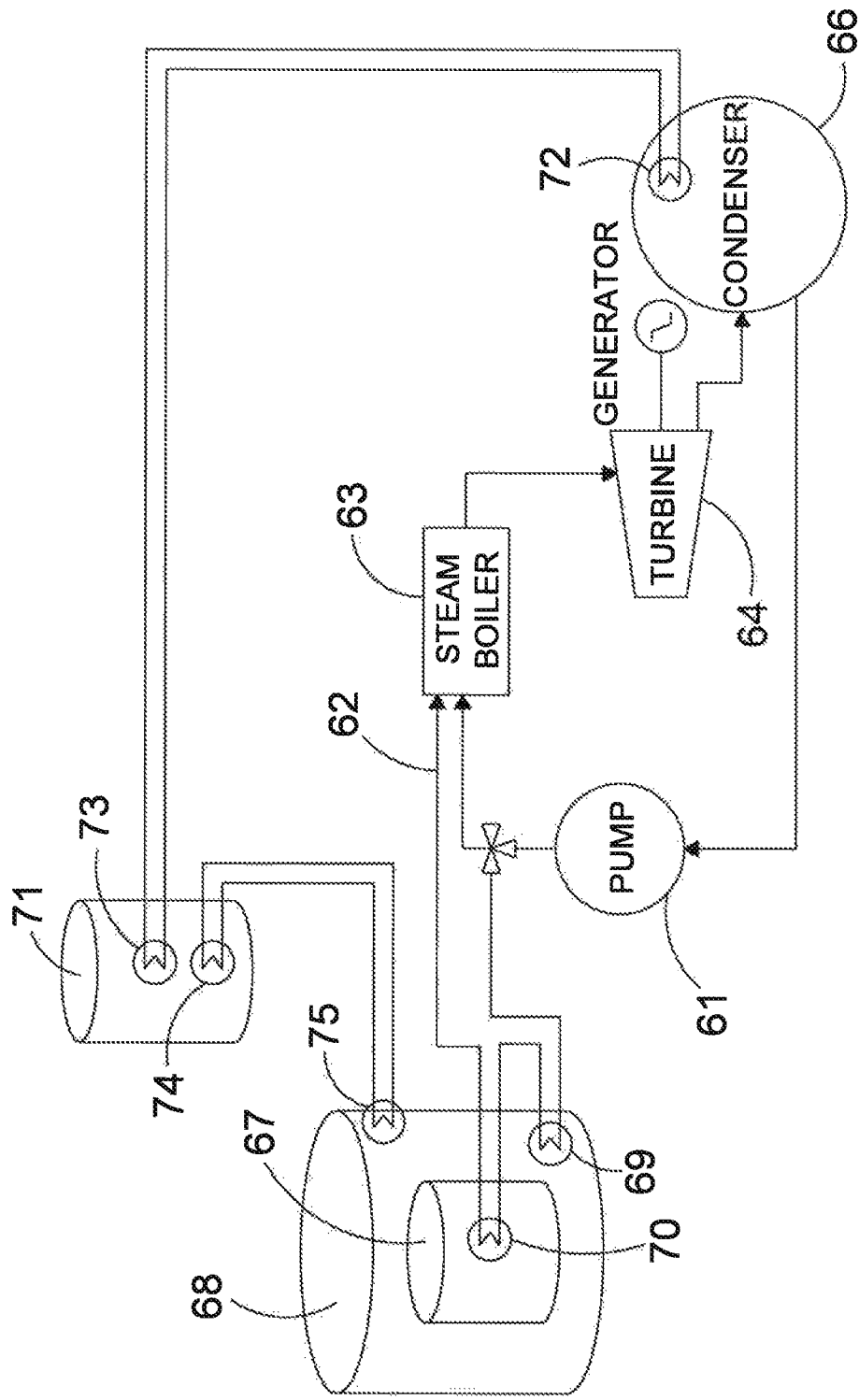
FIG. 3 is a schematic representation of a steam turbine-driven power station which has been converted into a UHTESS.

FIG. 2 shows in schematic form a gas-turbine power station which has been converted into a UHTESS. A conventional gas turbine draws air from the atmosphere via an air inlet 41, where the air is compressed in a compressor 42 and then mixed with a combustible fuel and burned in a combustor 45. A turbine 43 then extracts energy from the exhaust gas, and drives an electrical generator 56 and the compressor 42 through a rotating shaft 44.

This gas turbine generation system has been converted to an energy storage system by first directing the compressed gas produced by the compressor 42 out of the gas turbine through first and second heat exchangers 50, 51 which are connected to respective first and second thermal storage masses 48, 49 where the first storage mass 48 is contained by the second storage mass 49. Alternatively, gas passages may be formed within the storage masses 48, 49 which allow direct gas to storage medium contact.

Passing the gas through the thermal storage masses 48, 49 heats the gas and causes it to expand. At this stage the gas can be passed through the combustor 45, where fuel can be burnt to further heat and expand the gas if necessary. If the thermal storage system is depleted, it may be bypassed using three-way control valve 46 to reduce flow losses. The combustor 45 may also be bypassed using one or more additional valves (not shown) if it was not required. A pair of gas transmission pipes 47 transfer the gas from the gas turbine to the thermal storage system and back. These pipes 47 may be of the type shown in FIG. 11, which are described in more detail below.

The system may also be used to heat water which can be used for hot water and space heating. This may comprise an exhaust heat exchanger 54 in contact with the exhaust gas exiting the turbine 43. The exhaust heat exchanger 54 is connected to a first thermal store heat exchanger 53 contained within a thermal store 52. This thermal store 52 may also be heated with a connection to the second storage mass 49 to collect lost heat. This connection may comprise a second thermal store heat exchanger 55 in contact with the thermal store 52 in closed loop fluid communication with a third thermal store heat exchanger 58 in contact with the second storage mass 49. To reduce thermal losses in the system, the thermal insulation structures used in the system of FIG. 1 and described elsewhere herein may be used along with the concentric sequential thermal storage masses 48, 49. Alternatively, the storage mass arrangement of the FIG. 1 system may be used instead.

FIG. 3 shows in schematic form a steam-turbine power station which has been converted into a UHTESS. In a conventional steam turbine water is pumped via a pump 61 into a steam boiler 63, which is externally heated. The water is heated inside the boiler 63, turning into steam and expanding. A turbine 64 then extracts energy from the steam, and is used to drive an electrical generator 65. The steam is then condensed back to water in a condenser 66 and fed back into the pump 61.

This steam turbine generation system may be converted to an energy storage system by taking the water from the pump 61 and piping it to first and second heat exchangers 69, 70 that are in contact with respective first and second thermal storage masses 67,68. The water turns into steam and expands as it passes through the first and second heat exchangers 69,70. At this stage the steam can be passed through the steam boiler 63 where the steam can receive additional heating if necessary. If the thermal storage system is depleted, it can be bypassed to reduce flow losses using a three-way control valve 62, which also controls the flow of water from the pump 61 into the boiler 63 or first heat exchanger 69. The steam boiler 63 may also be bypassed using additional control valves (not shown) if it was not required.

As with the gas turbine system of FIG. 2, the steam turbine system of FIG. 3 may also be used to heat water which can be used for hot water and space heating. This may comprise a condenser heat exchanger 72 in contact with the steam exiting the turbine 64. The condenser heat exchanger 72 is connected to a first thermal store heat exchanger 73 contained within a thermal store 71. This thermal store 71 may also be heated with a connection to the second storage mass 68 to collect lost heat. This connection may comprise a second thermal store heat exchanger 74 in contact with the thermal store 71 in closed loop fluid communication with a third thermal store heat exchanger 75 in contact with the second storage mass 68.

Figure 4:
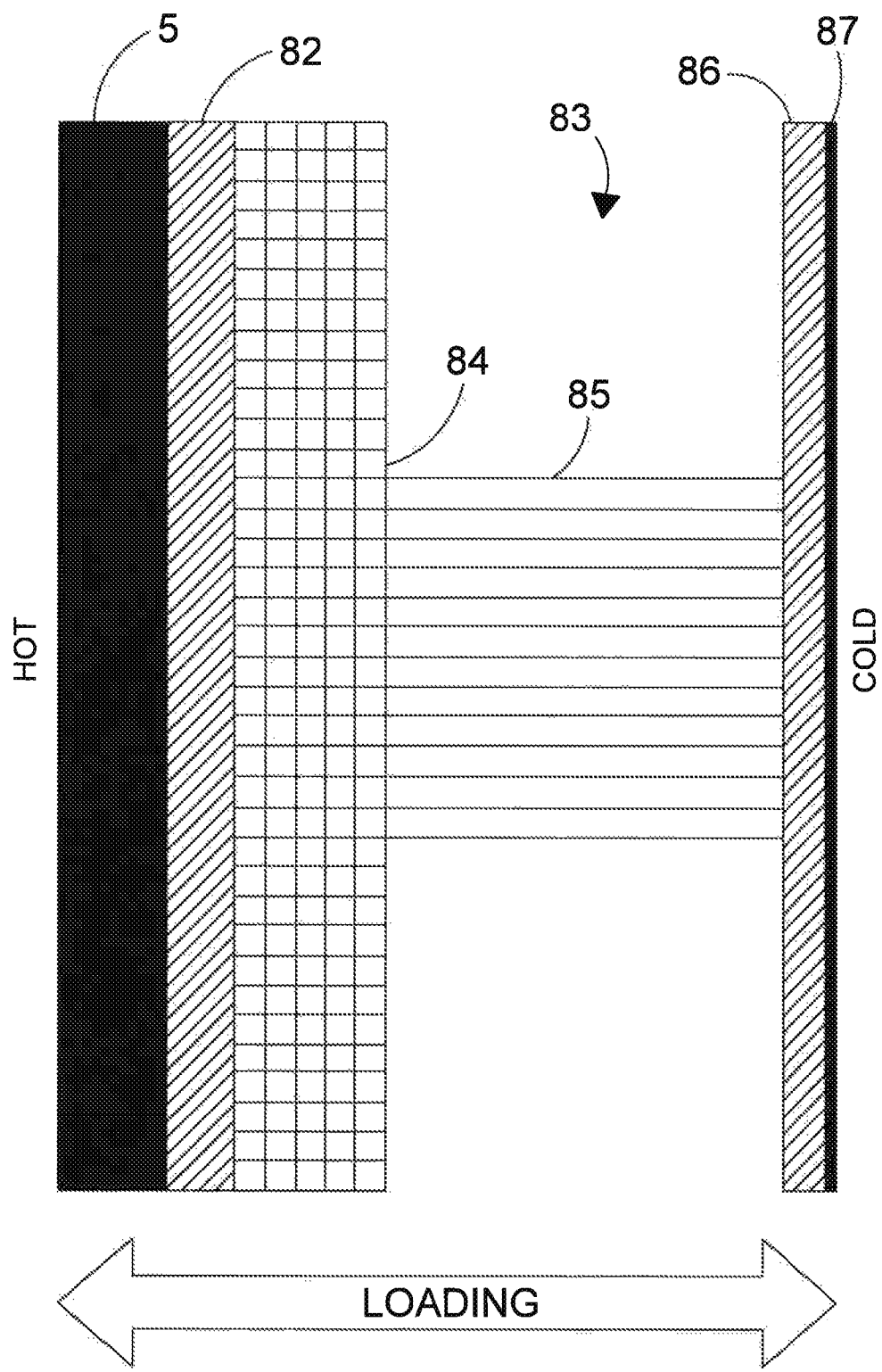
FIG. 4 is a cross-section of a first embodiment of a thermal insulation structure which may be employed in a UHTESS.

FIG. 4 shows a cross-section of a first embodiment of a thermal insulation structure with vacuum which may be employed in a UHTESS. As described above in relation to the standalone system of FIG. 1, this barrier may be employed to insulate the inner storage mass of the system, for example. This integrated barrier and vacuum may be used to reduce thermal losses through convection, radiation and conduction in systems, plants and processes that operate at Ultra-high temperature. Examples of such systems include but are not limited to energy storage systems of the type described elsewhere herein, and also heat engines, extractive metallurgy equipment, melting furnaces and chemical processing plants. In addition, the component can be used to provide structural support.

The component not only reduces heat transfer between hot and cold surfaces but also resists load predominantly in the same direction. When used to reduce heat loss in a thermal storage system such as that shown in FIG. 1 an inner layer of ceramic material 82 is sandwiched between the thermal storage mass 5 and a ceramic honeycomb 84 so that loads are distributed evenly across the honeycomb 84. The function of the honeycomb ceramic 84 is to act as a radiative barrier which reduces radiative heat transfer. The radiative barrier may alternatively be formed using successive layers of sheet, foil or film ceramic or metallic material.

The size, wall thickness, aspect ratio, number and shape of the cells in the honeycomb 84 will be determined by the operating temperature, temperature difference, loading and the limitations of the manufacturing process. The optimisation between these factors may be conducted with numerical models implemented within a mathematical or computer programming language which may have a textual or graphical interface.

Where structural support is required from the barrier a conduction attenuator 85 made with ceramic cells of high aspect ratio may be used. The size, wall thickness, aspect ratio, number and shape of the cells in the attenuator 85 will be selected to reduce conductive heat transfer whilst supporting the necessary loads. Where no load support is required a void 83 will be present in place of the conduction attenuator. The opposite side of the conduction attenuator 85 from the honeycomb 84 is connected to an outer layer of ceramic material 86 which distributes load evenly across a sealed metallic or ceramic envelope 87. This envelope 87 will fully enclose the thermal storage mass 5 and thermal insulation structure to allow a vacuum to be drawn inside the enveloped structure to minimise conductive and convective heat transfer. This envelope 87 can be supported internally or externally with a metallic or ceramic frame work.

The configuration shown in FIG. 4 would cause the thermal storage mass 5 to be within a vacuum and therefore require discreet sealed heat exchangers to transfer energy to and from it. If a thermal storage arrangement having two thermal storage masses was employed, as in the FIG. 1 system, an additional metallic or ceramic envelope would be required around the storage medium, which may be supported with an internal ceramic layer to distribute load.

To further optimise the conductive and radiative heat transfer whilst supporting the necessary loads it may be useful to vary the distribution of honeycomb cells within the barrier 84. For example, voids may be formed within the cellular structure of the barrier.

Figure 5:
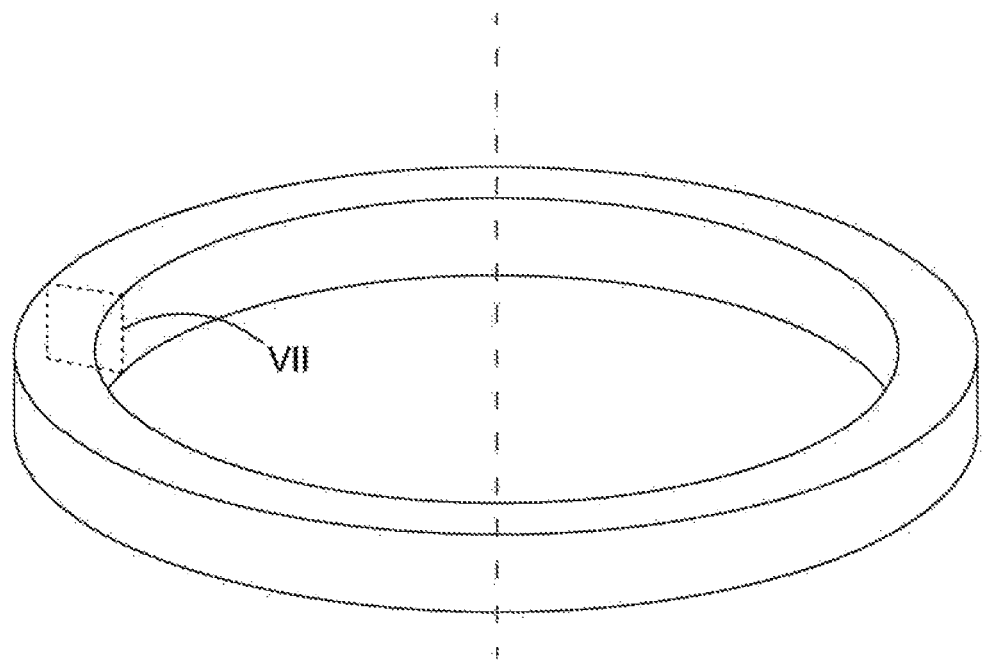
FIG. 5 is a perspective view of the thermal insulation structure shown in FIG. 7.

The ceramic honeycomb 84 and conduction attenuator 85 may have a uniform 2D profile that can be produced using an extrusion, drying and firing process. These profiles could be curved around a single axis to form cylindrical shapes using a modified extrusion process, as shown in FIG. 5. It should however be noted that FIG. 5 shows the thermal insulation structure of FIG. 7, where the structure is sealed within an outer envelope. These rings formed of cellular profile can be stacked to form cylindrical thermal loss reduction and structural support around a thermal system. Alternatively, the extruded cellular section could be rotated around a helix to form a cylindrical thermal losses reduction and structural support in a continuous manner. It may also be useful to produce alternative extruded shapes to surround other 3D object shapes such as, for example, a generally square extrusion which when stacked with other such extrusions would insulate and support a cubic shape.

Figure 6:
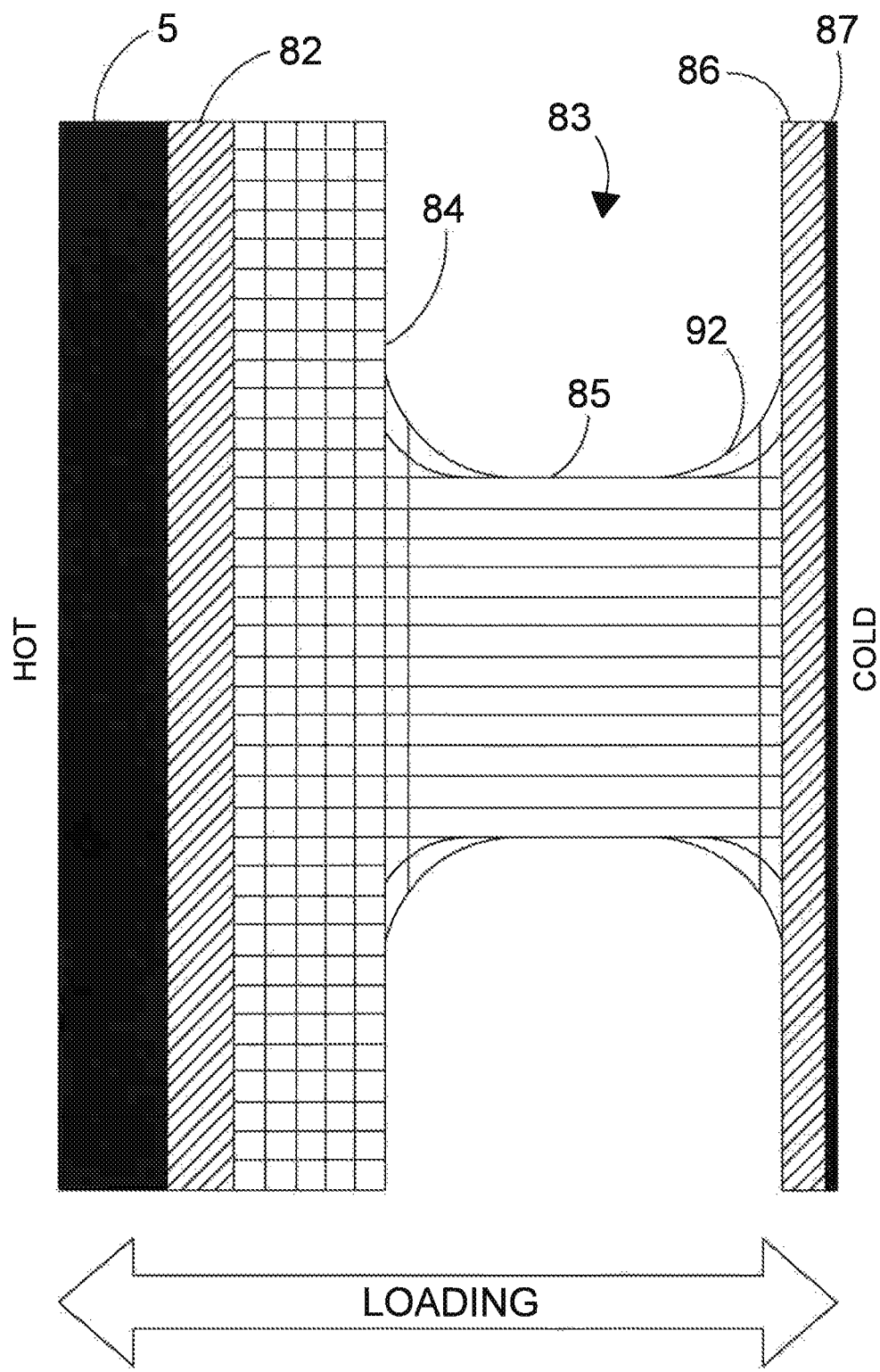
FIG. 6 is a cross-section of a second embodiment of a thermal insulation structure which may be employed in a UHTESS.

FIG. 6 shows a second embodiment of thermal insulation structure which, using honeycomb extrusion, comprises a combined honeycomb radiative barrier 84, conduction attenuator 85 and supporting structural elements 82, 86 in a single homogeneous piece of ceramic. It is also possible to add elements like webs 92 to the design that further optimise load resistance and heat transfer.

Figure 7:
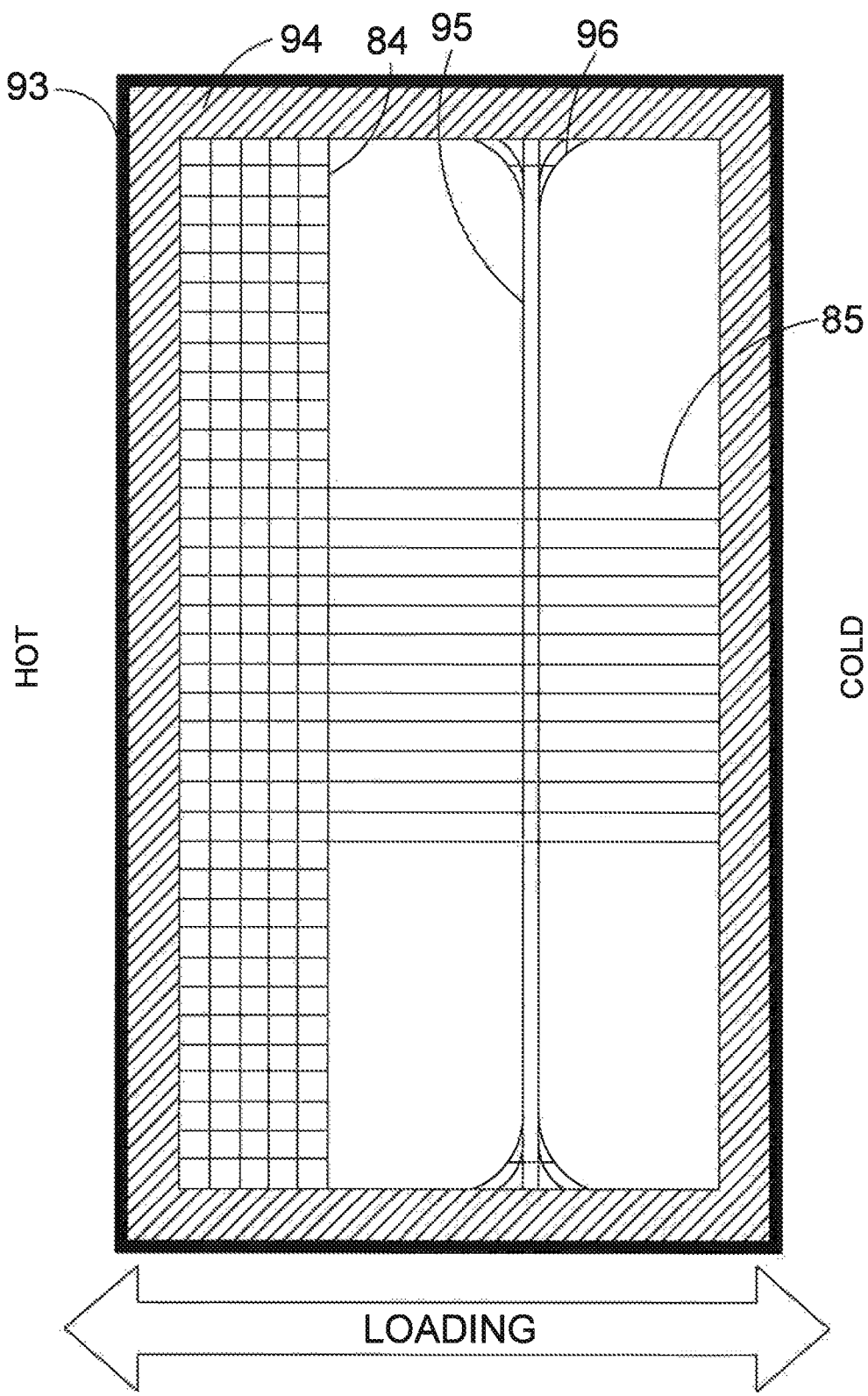
FIG. 7 is a cross-section of a third embodiment of a thermal insulation structure which may be employed in a UHTESS.

FIG. 7 shows a third embodiment of a thermal insulation structure. With the system shown in FIG. 1 at least, and with the first and second embodiments of the thermal insulation structure, an all-encompassing envelope is built around the inner storage mass, so a vacuum can be maintained. It may also be advantageous to build thermal loss reduction and load support structures using a collection of individually insulated panels, one of which is shown in cross-section in FIG. 7. In this embodiment, the radiative barrier 84 and conduction attenuator 85 are surrounded with a ceramic outer layer 94 which supports a fully sealed metallic or ceramic envelope 93. To support the loads caused by the vacuum it may be necessary to include additional support structures 95 and associated support webs 96. The size, wall thickness, aspect ratio, number and shape of the cells within the additional support structures and webs 95, 96 will be selected to reduce conductive and radiative heat transfer whilst supporting the necessary loads.

FIGS. 8(*a*) and 8(*b*) schematically illustrate a gas valve component used to direct or control the flow of a gas whilst minimising thermal losses through convection, radiation and conduction. The valve is intended for use in the various UHTESS described elsewhere herein, as well as in other systems, plants and processes operating at ultra-high temperature. Examples of such other systems include but are not limited to heat engines, extractive metallurgy equipment, melting furnaces and chemical processing plants.

Figure 8A:
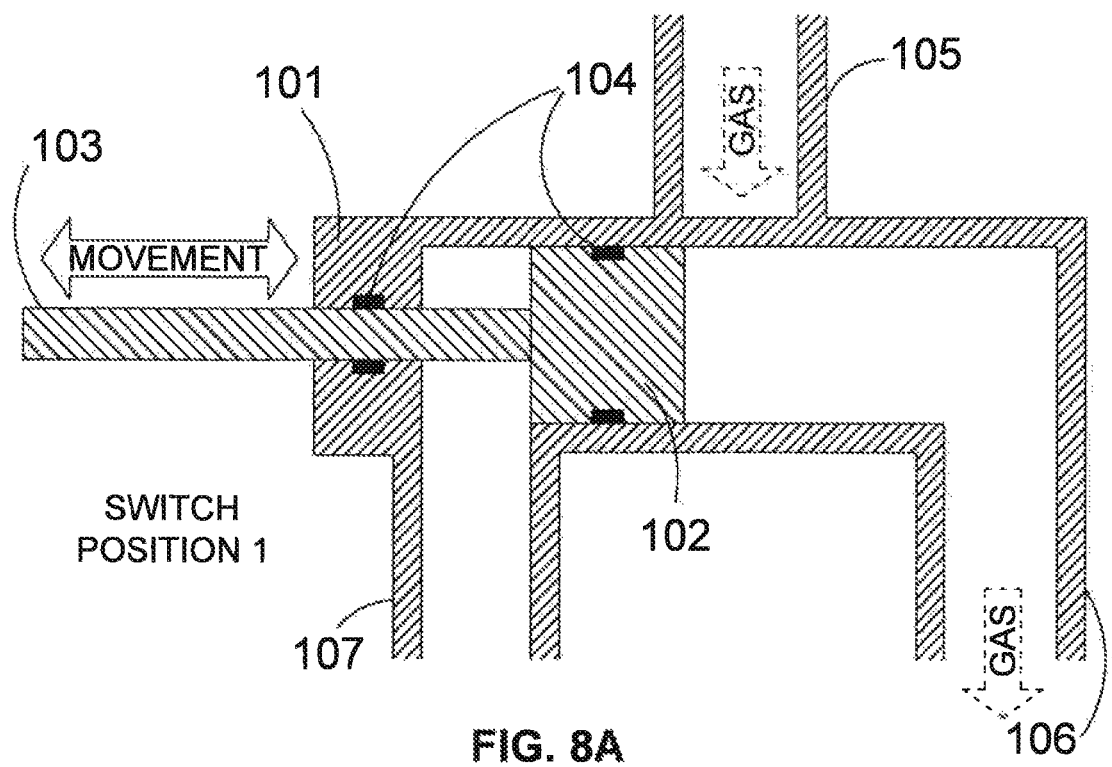
FIGS. 8(a) and 8(b) are schematic representations of a gas valve which may be employed in a UHTESS.
Figure 8B:
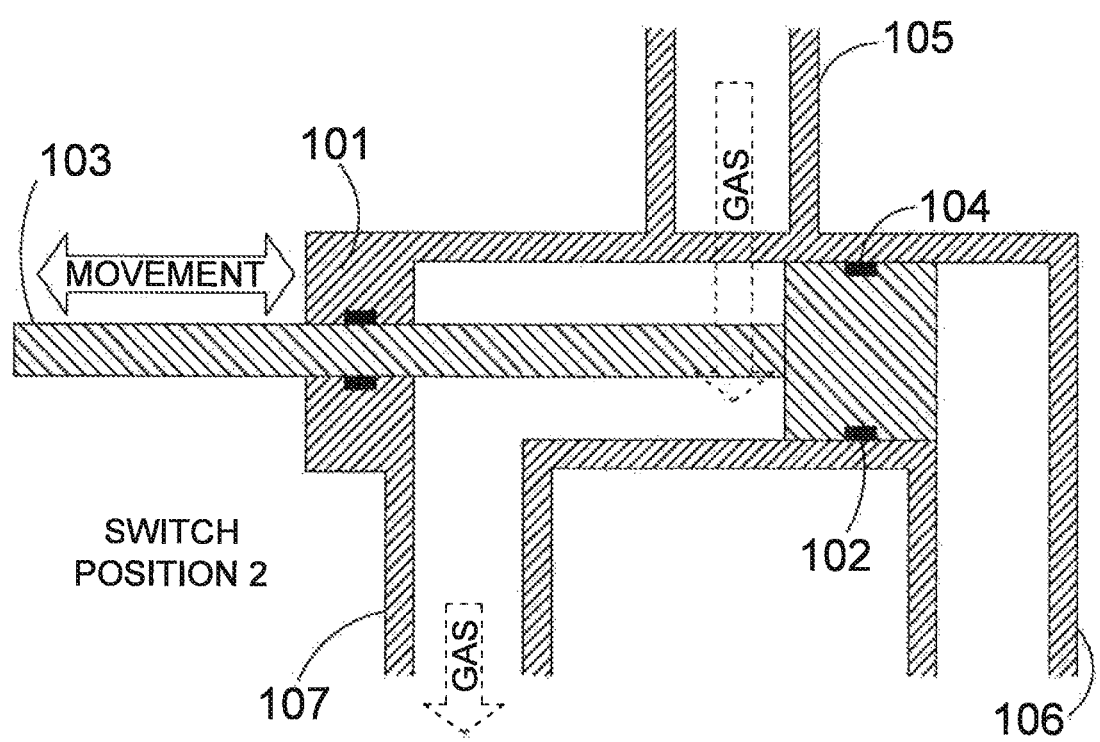

The valve is formed of a valve body 101, a valve member or disc 102 which moves to restrict or block flow in the required direction and a valve stem 103 which connects the valve disc 102 to an external actuator (not shown). For ultra-high temperature operation sealing is provided with elements that exploit the differential expansion of materials due to temperature increase. In one embodiment, the body 101 is constructed of a material with a low thermal expansion coefficient but the disc 102 and stem 103 are made with a material with a high thermal expansion coefficient. In this case, when the valve was at low temperature it would move freely due to clearance between the body 101, disc 102 and stem 103. Once sufficient heat is applied to the disc 102 and stem 103 they expand to seal the valve. The valve body 101 has an inlet 105 and first and second outlets 106, 107. FIGS. 8(a) and 8(b) show how the valve position would vary in order to direct gas flow from the inlet 105 down the first and second outlets 106, 107, respectively.

In an alternative embodiment the body 101, disc 102 and stem 103 are made from materials having similar thermal expansion coefficients and sufficient clearance to allow movement throughout the entire temperature range. In this scenario sealing would be provided by sealing elements 104 located between the stem 103 and the body 101, and between the disc 102 and the body 101. These sealing elements 104 have a greater thermal expansion coefficient than the body, disc and stem.

Examples of suitable materials having a low thermal expansion coefficient are cordierite and silicon nitride. In a preferred embodiment the low thermal expansion coefficient may be between $-4 \times 10^{-6}$ $K^{-1}$ and $4 \times 10^{-6}$ $K^{-1}$. An example of a suitable material having a high thermal expansion coefficient is alumina. In a preferred embodiment the high thermal expansion coefficient may be between $4 \times 10^{-6}$ $K^{-1}$ and $24 \times 10^{-6}$ $K^{-1}$.

To lower the thermal losses from the valve the body may be insulated and supported using the thermal insulation structures described above. The stem may be made with the same type of honeycomb ceramic extrusion, using the same technology and approach, as used to form the barriers and attenuators described in relation to those figures, thereby minimising heat loss whilst resisting the required load.

It would be necessary to cool the ultra-high temperature valve to allow actuation and therefore control gas flow. This may be achieved by external cooling of the valve and reduction of the hot gas flow passing through the valve using an upstream or downstream valve or switchable restriction.

Controlled melting processes which allow the use of solid to liquid phase storage at ultra-high temperatures in the systems described herein will now be described with reference to FIGS. 9(a) and 9(b). When most materials are heated they will usually experience thermal expansion, which will lead to significant damage of the storage vessel containing this material if a transition from solid to liquid and back to solid again is required. The issue arises from the fact that when the liquid medium solidifies it takes the form of the storage medium then when it is re-melted it expands and damages the container that holds it. This damaging effect of the expansion can be avoided with a concentrated, directed and controlled melting process.

Figure 9A:
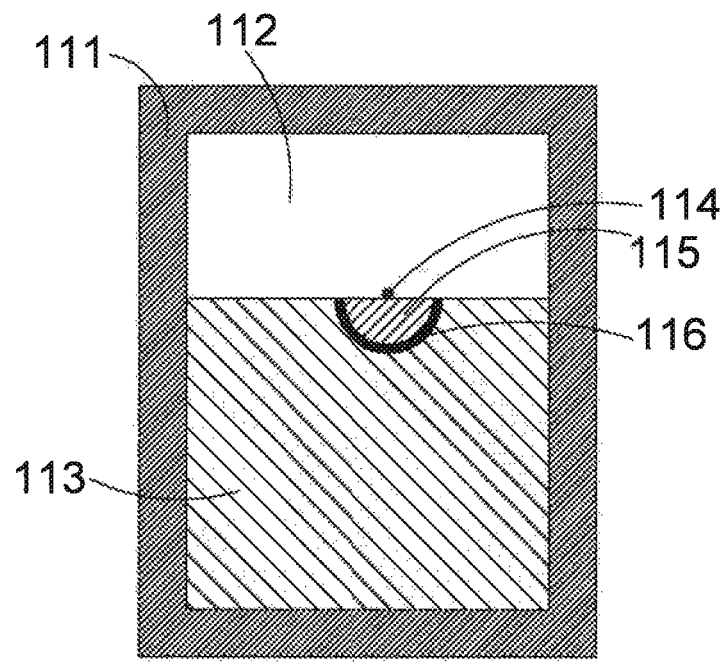
FIGS. 9(a) and 9(b) are illustrations of a process for melting a thermal storage medium within a thermal storage vessel of a UHTESS.

A first embodiment of a controlled melting process is shown in FIG. 9(a). An energy storage medium 113 is contained within a vessel 111, with the medium 113 covered with a gas 112 that will not react with the storage medium. Energy is focused on a point 114 at the surface of the energy storage medium 113. The energy is input as concentrated radiation which could be provided by a laser, for example. The energy is input at a sufficient rate to achieve a rapid transition of the material 115 immediately adjacent the focus point 114 to liquid without significant heating and therefore expanding the solid material 116 surrounding the molten material 115. This input of energy is maintained at a level required to keep the pool of molten material 115 at a sufficient temperature to rapidly melt the solid material 116 around it without significant heating and therefore expansion of the solid. The energy input is limited to avoid boiling of the storage material.

Figure 9B:
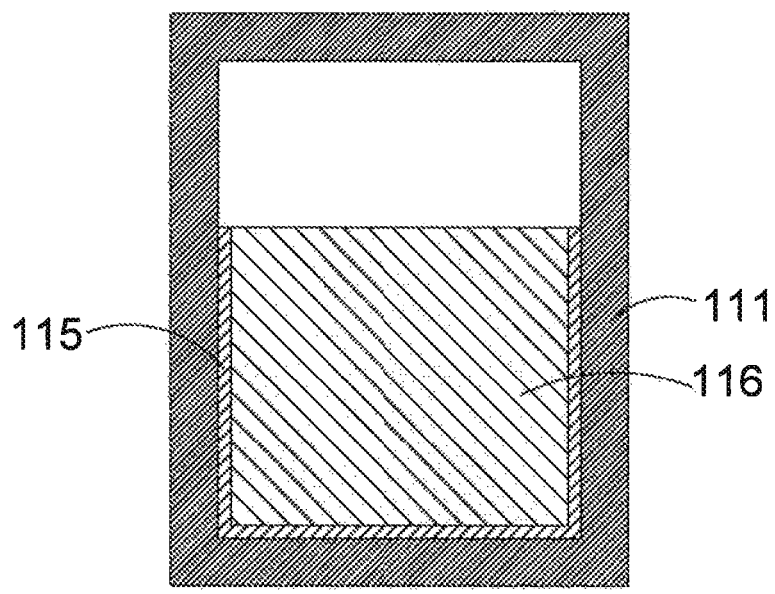

An alternative method of heating the storage medium without excessive material expansion is shown in FIG. 9(b), and this is to rapidly heat the medium 113 from the outside inwards. This may achieved using resistance heating elements imbedded within the walls of the vessel 111 or through induction heating. Again, energy is input at a sufficient rate to achieve a rapid transition to liquid of the outer molten material 115 without significant heating and therefore expansion of the solid material 116 adjacent that molten area.

Figure 10:
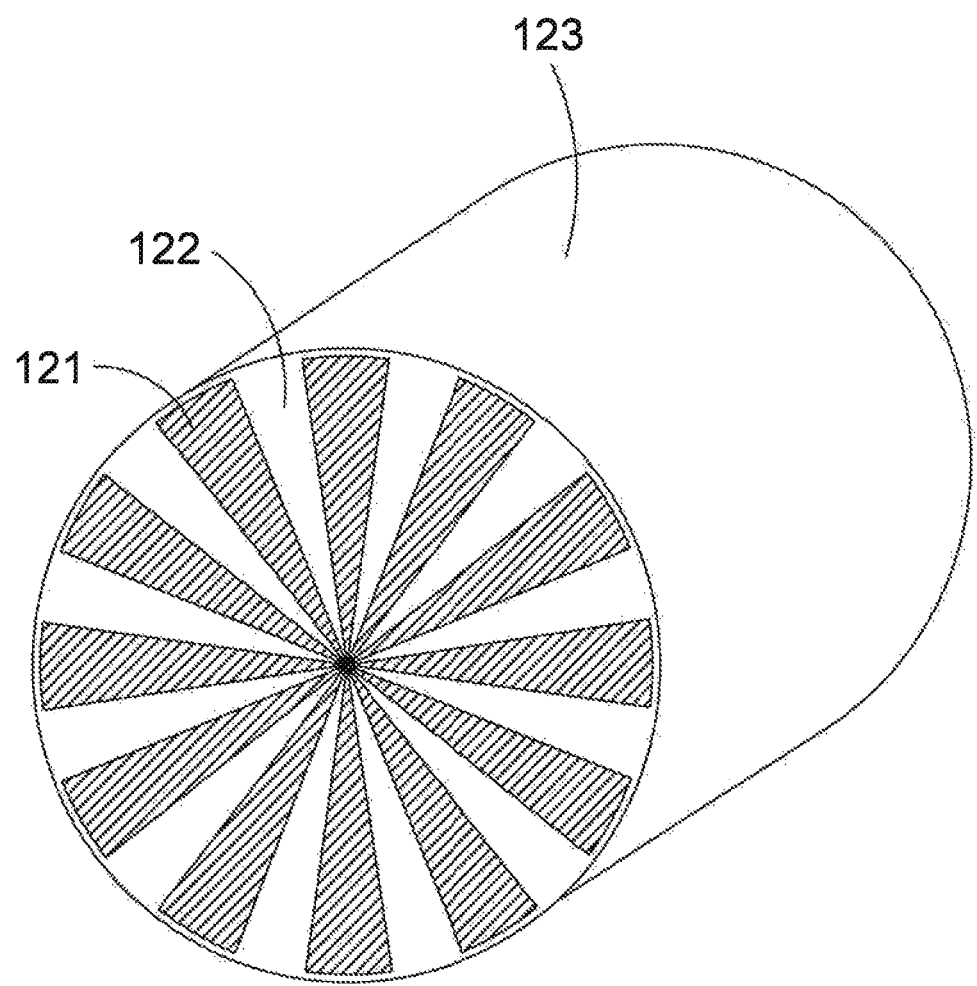
FIG. 10 shows a heat exchanger which may be employed in a UHTESS.

FIG. 10 illustrates a gas to solid or liquid heat exchanger which may be used in the UHTESS described herein. The ceramic heat exchanger is formed using an extrusion, drying and firing method. This heat exchanger transfers heat between the outer wall 123 and the gas flowing through it. The cellular elements 121 transfer the heat from the gas to the solid before this heat is conducted to the outer wall 123 using a solid conductive element 122. The shape, size and quantity of cellular elements is determined in combination with the thickness, quantity, taper and placement of the solid conductive elements to optimise the required heat transfer rate with the volumetric space requirement and pressure losses. This optimisation is conducted with numerical models implemented within a mathematical or computer programming language which may have a textual or graphic interface. It may be advantageous to create solid to gas heat exchangers in any 2D profile shape rather than circular as shown in FIG. 10, such as a square section, for example.

The heat exchanger profiles may be cut to length to form solid to gas heat transfer elements or curved around a single axis to form cylindrical shapes using a modified extrusion process of the same kind as results in the thermal insulation structure shape shown in FIG. 5. These rings formed of extruded ceramic profile can be stacked to form cylindrical heat exchangers which could also provide structural support around and inside a thermal system. Alternatively, extruded honeycomb sections could be rotated around a helix to form a cylindrical thermal loss reduction and load support structure in a continuous manner.

Figure 11:
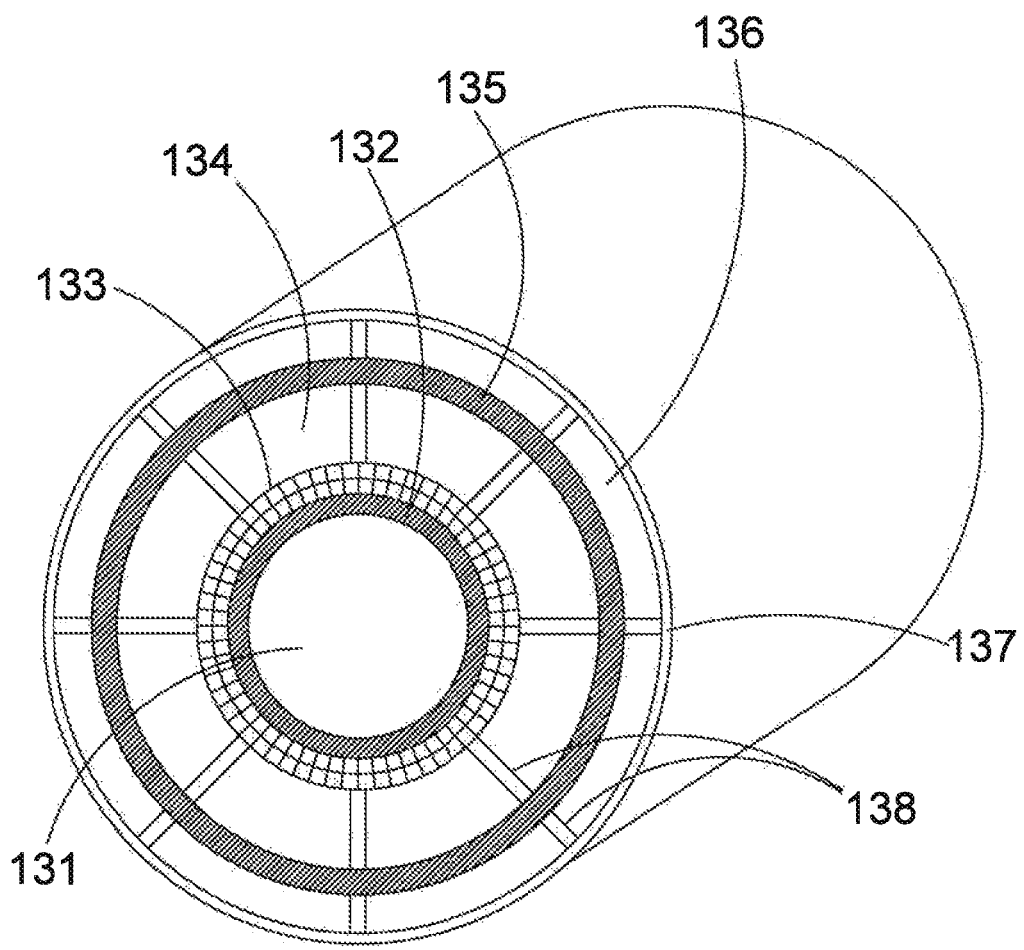
FIG. 11 shows a gas transmission pipe which may be employed in a UHTESS.

FIG. 11 shows a section of a gas transmission pipe suitable for use in ultra-high temperature operations such as UHTESS and similar applications. This pipe allows the transfer of gas through a system at ultra-high temperatures with minimal thermal losses. Gas at ultra-high temperatures is transmitted through a ceramic central pipe 132 having a bore 131. The strategy used to reduce thermal losses from the pipe is like that described in above with respect to the embodiments of the thermal insulation structure. The pipe 132 is surrounded by a honeycomb layer 133 of ceramic material to act as a radiative barrier and reduce radiative heat transfer. The size, wall thickness, aspect ratio, number and shape of the cells will be determined by the operating temperature, temperature difference, loading and the limitations of the manufacturing process. Where structural support is required conduction attenuators 138 made with ceramic cells of high aspect ratio may extend radially from the honeycomb layer 133. The size, wall thickness, aspect ratio, number and shape of the cells will be selected to reduce conductive heat transfer whilst supporting the necessary loads. This optimisation is conducted with numerical models implemented within a mathematical or computer programming language which may have a textual or graphic interface. Where no load support is required an inner void 134 will exist outside of the honeycomb layer 133 in place of conduction attenuators.

The conduction attenuator 138 is surrounded with an outer layer of ceramic or metallic material to form a sealing wall 135. Between the sealing wall 135 and the pipe 132 a vacuum is drawn to minimise conductive and convective heat transfer. An outer void 136 is formed between the sealing wall 135 and an outer wall 137. If a two-way flow of gas is required for example where cooler gas is transported from gas turbine to an energy storage system for heating then returned to the gas turbine, the cooler gas would pass through the outer void 136 and hot gas would return through the central pipe 132. By doing this the energy lost from the hot gas would be collected lowering overall thermal losses. Alternatively, the outer void may be omitted if only unidirectional gas flow was required.

The complete insulated pipe would be formed in a single piece using a ceramic extrusion process. Curves and turns in the pipe would be achieved by guiding the ceramic profile around a former which would support it during the drying and firing process. The insulated pipe may be supported within a metallic pipe with a layer of conventional insulation between the outer surface 137 of the insulated pipe and the metallic pipe, apart from where direct contact is required for structural support.

Figure 12:
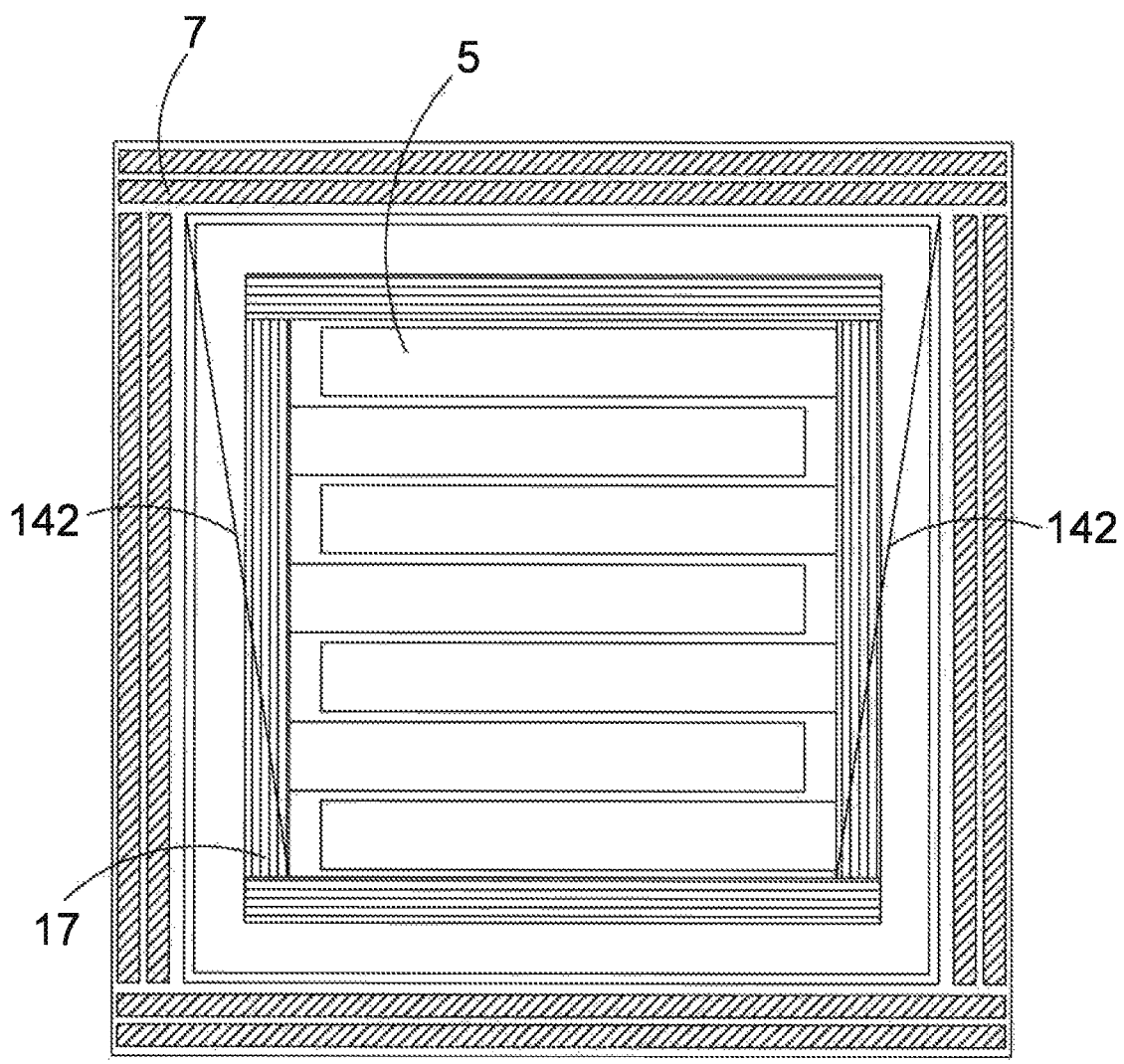
FIG. 12 illustrates an example of a load-bearing arrangement which may be employed to support a thermal storage vessel in a UHTESS.

FIG. 12 illustrates a load bearing arrangement which may be used in ultra-high temperature applications in order to lower conductive heat losses whilst providing structural support. A heated component, which may be for example the inner thermal storage mass 5 employed in the system shown in FIG. 1, is suspended on support elements 142 which are in tension. These elements 142 have the minimal cross-sectional area required to resist the tensile loads safely whilst their length is maximised to reduce conductive losses. Each element will be anchored at a first end to the inner thermal mass and at a second end to a support structure such as the outer thermal storage mass 7, for example, to further transmit loads. The support elements 142 may pass through a thermal insulation structure 17 which surrounds the inner storage mass 5, without any contact between the support elements 142 and the barrier 17. To maximise the length of support elements they may be crossed over, generally forming an "X", whereby each element will have a first end connected to an upper corner of the outer support structure and a second end connected to an opposite lower corner of the inner heated component. There is no contact between crossed over elements.

It should be understood that any of the specific components described in respect of the standalone UHTESS of FIG. 1 may be incorporated in the systems of FIGS. 2 and 3 if desired.

A pipe is required if it were necessary to transfer gas to and from a hot component or system, which may be the inner storage mass of the systems described herein. This pipe may be situated in the vacuum formed in the thermal insulation structure which surrounds the inner storage mass. The pipe can be convoluted (e.g. as a spiral, c-shape or e-shape) within the space available to maximise its length, hence minimising conductive losses between the start of the pipe and its end. The cross-section, length wall thickness and shape of the pipe are selected to reduce conductive heat transfer and pressure losses whilst supporting the necessary loads. This optimisation is conducted with numerical models implemented within a mathematical or computer programming language which may have a textual or graphic interface. It may be necessary to provide additional support to this pipe with additional material joined to an external support structure or using the support elements described with reference to FIG. 12. To minimise thermal losses these pipes will be built in the form shown in FIG. 11, or else be surrounded by successive layers of material to form radiative barriers.

A thermal storage system according to the present invention may have an extraction cycle which can achieve the required temperature at the turbine entry by either burning combustible gas, liquid, pulverised solid or by heating gas with energy stored in a medium. Alternatively, a combination of stored heat and combustion can be used sequentially to achieve the required turbine entry temperature.

It may be advantageous to add additional systems to the UHTESS shown in FIG. 1 to further improve its utility. A heat pump may be added between the liquid jacket and the outer storage mass, or else between the inner and outer storage masses to pump heat inwards. These heat pumps may comprise: an independent or integrated heat exchanger in the cold reservoir, which may be the outer storage mass; a compressor; an independent or integrated heat exchanger in the hot reservoir, which may be the inner storage mass; a turbine which drives the compressor with a shaft or other device with a sufficient pressure drop; and a motor to drive the compressor.

An additional heat engine such as a sterling engine could also be installed between the outer storage mass and the liquid jacket, or the outside to generate additional electricity. Heat can be supplied to this engine with a heat exchanger independent or integrated with the outer storage mass. If this heat exchanger is integrated or connected with the first exhaust heat exchanger the heat engine would act as a bottoming cycle for the gas turbine. It may also be advantageous to use the outer storage mass and the pair of exhaust heat exchangers to provide heat to the additional heat engine using an extra systems of valves.

To improve temporal response to electricity demand it may be possible to integrate an energy storage flywheel into the system indirectly which would utilise the same power electronics as the generator but switch off once the gas turbine was at operating speed. It would also be possible to use a flywheel linked directly to the rotating shaft of the gas turbine via a clutch mechanism to decrease the time to reach operational rotational speeds. A decreased start up time could also be achieved by supplying stored compressed air to the turbine through a series of valves. Alternatively, a supercapacitor or electro chemical battery could be used to supply electricity before the gas turbine is started Instead of gas passages extending through the inner and outer thermal masses, the UHTESS of FIG. 1 may employ one or more heat exchangers to transfer heat to the thermal masses from the compressed air. In such an arrangement the bricks making up the storage masses may be stacked without gaps to form a thermal mass and the or each heat exchanger can be placed in direct contact with this mass to transfer heat to and from the gas. Furthermore, whilst only two thermal masses are used in the system of FIG. 1 more may be added to reduce thermal system losses or to provide heat at specific temperatures.

Instead of employing hot water and heating heat exchangers in a thermal store for hot water and heating, alternative arrangements may be used. For example hot water may be supplied directly from the liquid jacket. Alternatively, gas may be passed through the jacket and sent directly to a space heating system, or a heat exchanger arrangement attached to any of the thermal storage masses could be connected to a hot water or space heating system.

An additional heat engine such as a sterling engine could also be installed between the outer concentric storage mass and the jacket or the outside to generate additional electricity.

To improve temporal response to electricity demand it may be possible to integrate an energy storage flywheel into the system indirectly which would utilise the same power electronics as the generator. It would also be possible to use a flywheel linked directly to the shaft of the gas turbine via a clutch mechanism to decrease the time to reach operational rotational speeds. A decreased start up time could also be achieved by supplying stored compressed air.

An additional energy store with different response characteristics (e.g. supercapacitor or electro chemical battery) could be used to supply electricity before the gas turbine is at operating speed.

Where components are described herein as being formed from a ceramic material it should be understood that the invention is not limited to the use of this material for such components. For example, the ceramic components and layers described herein may alternatively be formed from a suitable metallic material.

These and other modifications and improvements may be incorporated without departing from the scope of the present invention.

The invention claimed is:

1. A thermal energy storage system, comprising:
at least two thermal storage masses, wherein an inner thermal storage mass is contained within an outer thermal storage mass and includes one or more electrical heating components for direct heating of the inner thermal storage mass, wherein the inner storage mass is suspended from the outer storage mass by a plurality of support elements which are in tension;
a pump or compressor which forces a compressible fluid around the system;
a first storage mass heat exchanger having a first side in fluid communication with the pump or compressor, and a second side in contact with the outer thermal storage mass;
a second storage mass heat exchanger having a first side in fluid communication with the first side of the first storage mass heat exchanger, and a second side in contact with the inner thermal storage mass.

2. The system of claim 1, further comprising:
a turbine having a turbine inlet in fluid communication with the first side of the second storage mass heat exchanger, and a turbine outlet; and
an electrical generator which is driven by the turbine.

3. The system of claim 2, further comprising:
a thermal store containing a thermal store medium;
at least one thermal input heat exchanger located in the thermal store, the at least one thermal input heat exchanger having a first side adapted to receive heat from the outer thermal storage mass, and a second side in contact with the thermal store medium; and
at least one thermal output heat exchanger located in the thermal store, the at least one thermal output heat exchanger having a first side in fluid communication with a hot water and/or heating supply, and a second side in contact with the thermal store medium.

4. The system of claim 3, further comprising:
first and second turbine outlet heat exchangers, each having a first side in fluid communication with the turbine outlet; and
a liquid jacket surrounding the outer thermal storage mass, the liquid jacket in fluid communication with the first side of the at least one thermal input heat exchanger;
wherein a second side of the first turbine outlet heat exchanger is in contact with the outer thermal storage mass; and
a second side of the second turbine outlet heat exchanger is in contact with the liquid jacket.

5. The system of claim 3, further comprising:
first and second thermal input heat exchangers located in the thermal store;
a third storage mass heat exchanger having a first side in contact with the outer thermal storage mass, and a second side in fluid communication with the first side of the first thermal input heat exchanger; and
a turbine outlet heat exchanger having a first side in contact with the turbine outlet, and a second side in fluid communication with a first side of the second thermal input heat exchanger.

6. The system of claim 5, wherein the turbine outlet comprises an exhaust in fluid communication with an exhaust heat exchanger or a condenser.

7. The system of claim 2, further comprising a storage mass bypass downstream of the pump or compressor, the bypass selectively sending the compressible fluid directly to the turbine whilst bypassing the first and second storage mass heat exchangers.

8. The system of claim 7, further comprising:
a combustor having an inlet in fluid communication with the second storage mass heat exchanger and the storage mass bypass, and an outlet in fluid communication with the turbine; and
a combustor bypass for selectively sending fluid directly to the turbine from the second storage mass heat exchanger or storage mass bypass whilst bypassing the combustor.

9. The system of claim 1, further comprising a first insulating barrier surrounding the inner thermal storage mass, the barrier comprising:
an inner layer abutting an outer surface of the inner thermal storage mass;
a honeycomb layer abutting the inner ceramic layer;
an outer layer spaced apart from the honeycomb layer such that a void is formed therebetween; and
an enclosing envelope upon the outer layer.

10. The system of claim 9, wherein the void is at least partially filled with one or more attenuators extending from the honeycomb layer to the outer layer.

11. The system of claim 9, wherein the first insulating barrier is formed from a plurality of separate barrier panels, where each panel is enclosed by a separate envelope.

12. The system of claim 11, wherein each insulating barrier panel further comprises at least one structural support member which extends through the void in a direction generally parallel to the layers of the barrier.

13. The system of claim 9, further comprising:
- a second insulating barrier surrounding the outer thermal storage mass, the second insulating barrier being formed from a cellular and/or porous material;
- a vacuum pump fluidly connected to the first and second insulating barriers so as to form and vary the strength of a vacuum therein; and
- a plurality of valves which allow the vacuums in the insulating barriers to be varied independently.

\* \* \* \* \*